United States Patent [19]

Garwin et al.

[11] Patent Number: 4,642,422
[45] Date of Patent: Feb. 10, 1987

[54] CALIBRATION OF A SCANNING LIGHT INTERRUPT TYPE OF DATA INPUT INTERFACE

[75] Inventors: Richard L. Garwin, Scarsdale; James L. Levine, Yorktown Heights, both of N.Y.

[73] Assignee: International Business Machines Corporation, Armonk, N.Y.

[21] Appl. No.: 809,639

[22] Filed: Dec. 16, 1985

[51] Int. Cl.4 .............................................. G08C 21/00
[52] U.S. Cl. ..................................... 178/18; 356/375; 250/491.1
[58] Field of Search ............... 178/18, 19; 356/1, 375, 356/141; 250/252.1, 491.1; 364/560, 571; 340/206, 207

[56] References Cited

U.S. PATENT DOCUMENTS

| | | | |
|---|---|---|---|
| 3,613,066 | 10/1971 | Cooreman | 340/347 |
| 4,294,543 | 10/1981 | Apple et al. | 178/18 X |
| 4,558,313 | 11/1984 | Garwin et al. | |
| 4,553,842 | 11/1985 | Griffin | 356/375 |
| 4,568,182 | 2/1986 | Modjallal | 356/141 |

FOREIGN PATENT DOCUMENTS 1575420 9/1980 United Kingdom .

Primary Examiner—Stafford D. Schreyer
Attorney, Agent, or Firm—Alvin J. Riddles

[57] ABSTRACT

Correlation of light beam movement with electrical timing in a light beam interrupt data input interface device is provided by determining the magnitude of an angular difference between the electrical system and a line through the scanning axis for use as a correction factor. The correlation principle involves a combination of measurement with respect to the electrical system and the application of geometric principles to provide a correction factor.

9 Claims, 10 Drawing Figures

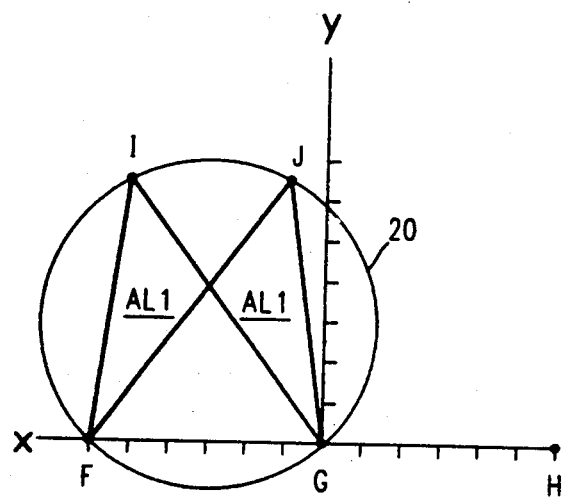
FIG.7
FIG.8
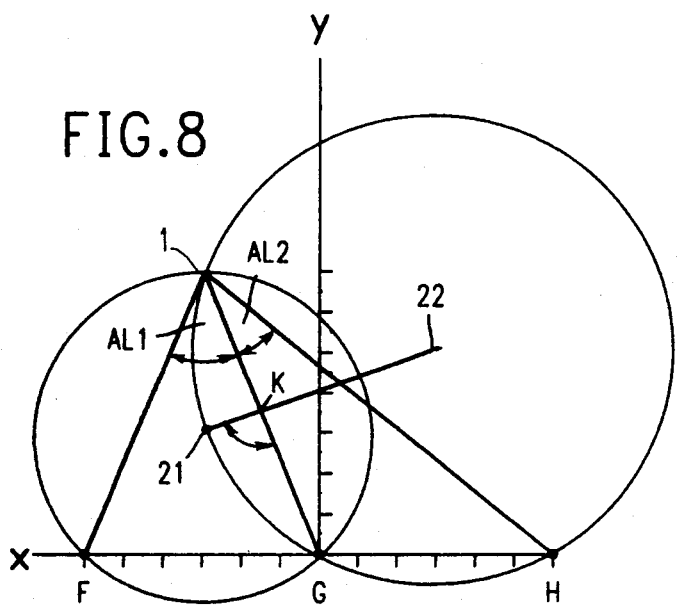

CALIBRATION OF A SCANNING LIGHT INTERRUPT TYPE OF DATA INPUT INTERFACE

DESCRIPTION

1. Technical Field

The technical field of the invention is in devices that use the interruption of a scanning beam of light to convert the location of an object in a work area into machine location information such as coordinates for entry into data processing apparatus. The work area is usually the face of a display and the object is usually a user manipulated stylus or even a human finger.

The light beam interrupt data input equipment employs a moving member that sweeps a beam of light essentially parallel to the work area surface so that the location of an object in the area of the surface may be established from information acquired when the moving light beam intersects the object.

The light beam when striking the object in the work area produces an event such as a variation in light level or the reflection of the light from the object which is used, together with the angular position of the beam at that time, in calculations that provide the coordinate information of the location of the object.

2. Background Art

One technique employed in the art to indicate the angular position of the light beam is to use a device known as a shaft encoder which converts the angular position of a shaft on which a light source is mounted to an electrical signal. Illustrations of this type of construction are shown in UK Patent No. 1,575,420 and in U.S. Pat. No. 3,613,066.

Another technique in the art employs light reflected from a mirror at the periphery of the work area that corresponds to a beam from a location that is a virtual image of the light source. In one illustration of this type of construction, the sweep is timed by the light beam striking a detector member mounted in the periphery of the work area and is shown in U.S. patent application Ser. No. 06/667,509 filed 11/1/84.

Another illustration of this type of construction is shown in U.S. patent application Ser. No. 789,610, filed Oct. 21, 1985, wherein information is acquired from the serial occurrence of the intersection, with the object in the work area, of a direct beam and a reflected beam.

While manufacture to close tolerances provides generally satisfactory operability, greater position accuracy and simpler and considerably less expensive construction can be achieved with an improvement in the light beam interrupt type of data input equipment by precisely correlating the mechanical scan movement with the electrical system. This is particularly advantageous where the work area is the face of a display.

BRIEF DESCRIPTION OF THE DRAWINGS

FIG. 7 is a geometric illustration of the circular locus of points, through a pair of targets and one scanner.

FIG. 8 is a geometric illustration of the scanner location by the intersection of two circular loci of points.

DISCLOSURE OF THE INVENTION

Figure 1:
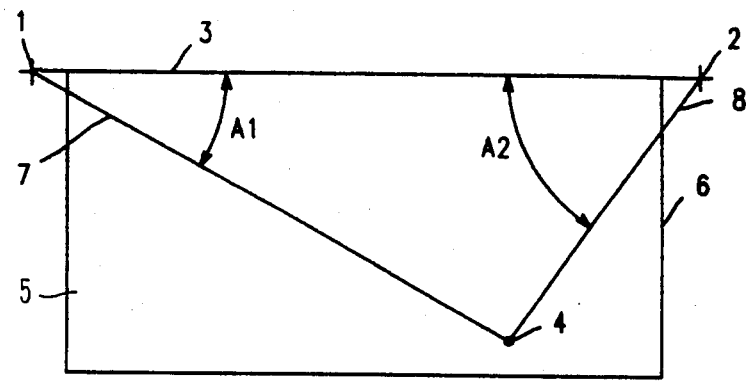
FIG. 1 is a geometric illustration of the information involved in the calculation of the location of an object in a work area in a two scanner type light beam interrupt data input device.

The invention is the correlation of the electrical signal and mechanical movement systems of a scanning light interrupt type of data input interface to provide location data with respect to a specific reference.

A specific reference in the form of a base line through the scanner is established. The electrical signal system is compared with respect to that base line and a correction is entered.

The invention employs the combination of a calibration template that supplies calibration targets with known intertarget distances positioned at measurement facilitating separation, electrical system signals related to rotational arc of the scanner and geometric principles, to establish the difference between the electrical signal at the start of a scanning sweep and the base line so that that difference can be employed in the calibration.

The invention will be described in connection with two scanners although it will be apparent to one skilled in the art in the light of the principles described that applications involving virtual image sources can be a simple extension.

Two scanner light beam interrupt data input devices generally measure angles to the object from the two positions from which the sweeping light beams emanate. The sweeping light beams are generally produced at the positions by rotating mirrors reflecting fixed lights. The axis of rotation of each mirror is perpendicular to the line which passes through both axes. The coordinates of the object in the work area are then calculated from the combination of information of the distances in the device and the angles.

In devices of this type, however, systematic errors in measuring the angles are very difficult to correct at a later step because the coordinates are a non-linear function of the angles. There are two types of such errors. They may be referred to as scaling errors and as index errors. Scaling errors involve an incorrect constant of proportionality between scanner readout increments and scanner motion angular increments. Index errors occur if the zero count does not correspond to the zero angle as measured from some desired reference.

Considering first scaling errors, these can be eliminated by using a continuously rotating scanner with an angular readout. Although many types of readout are possible, a particularly convenient angular readout for a rotating mirror scanner is a digital counter incremented by a constant frequency clock. Such a counter may be reset to zero once per scanner revolution, for example, when the scanner beam strikes a fixed target, such as a signal detection photocell. The count value may be then read whenever the beam intersects an object in the work area whose angle is needed. Since the scanner rotates uniformly, the readout angle between a fixed target seen on sequential scans must be equal to the known full scanner rotation angle and thus a simple measurement can be used to set the scale factor. The readout mechanism described above is particularly suitable for such a measurement. If the relationship between the scanner rotation rate and clock frequency is known, the scaling factor may be calculated without measurement as would also be the case if the scanner were driven by a synchronous motor whose drive signals were derived from the counter clocking signal.

The index error between readout zero and a geometric reference line is much more difficult to handle. Such an error cannot be automatically eliminated. It must be measured and then removed from the data prior to the calculation of the X and Y coordinates.

One such reference is the line that goes through the axis of revolution of each scanner. This reference line will be referred to as the base line. The angle between the position of the sweep at the electrical system start location and the base line will be referred to as the index error.

The index error, once determined, is employed as a correction in all calculations of the location of an object in order to provide coordinates that are calibrated with respect to the base line.

In accordance with the invention, determination of the index error is established by supplying angular information in a template, obtaining scanner readout measurements, and making use of a calculation based on geometric principles.

In FIG. 1, there is provided a geometric illustration of the type of information involved in the coordinate calculation that takes place in a two scanner light beam interrupt type of device. Referring to FIG. 1, the scanners 1 and 2 are each mounted to revolve on an axis perpendicular to a base line 3. When an object, such as a human finger or stylus 4 is positioned in the work area 5, the periphery of which is 6, the light beams 7 from scanner 1 and 8 from scanner 2, each intersect the stylus 4 and the light variation event that occurs is used in determining the angle of rotation from a beginning at the base line 3 to the event. The combined information of the magnitude of each of angles A1 and A2 and the distance from the axis of scanner 1 to scanner 2 is employed in a standard trigonometric calculation to provide the X-Y coordinate values of the location of the stylus 4 in the work area 5.

In this type of construction, it is costly to so accurately position the components that the readout of the angles A1 and A2 begin at the base line 3.

In accordance with the invention, increased simplicity, reduced cost and greater accuracy is achieved by calibrating the particular device to identify any index error, which is an angular difference between the electrical signal signifying the start of a sweep by the light beam and the base line 3, so that the index error can be used to correlate the electrical and mechanical systems.

Figure 2:
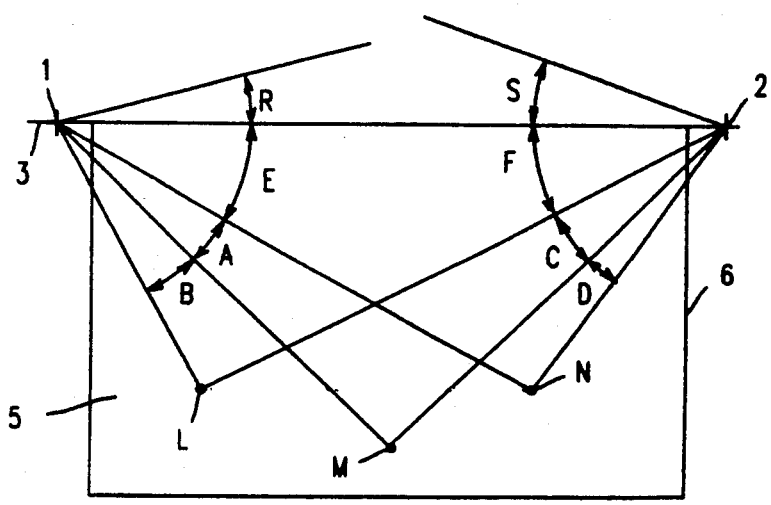
FIG. 2 is a geometric illustration of the angles and distances involved in the calibration principles of the invention.

In FIG. 2, there is a geometric illustration of the information involved in determining the index error for each scanner. In FIG. 2 the index error angles between the electrical indication of the start of a sweep by the light beam and the base line 3 are labelled R and S. For illustration clarity, they are shown to be unequal and in an exaggerated scale.

In accordance with the invention, once the magnitude of the index error angles R and S has been established, the particular values are then employed as a correction in each X-Y coordinate determination in the apparatus to relate the X-Y coordinate values with the reference base line 3.

The technique of the invention simplifies component positioning and assembling. The values of the angles R and S can be established when the device is fully assembled in normal working order.

Referring further to FIG. 2, within the periphery 6 of the work area 5, three calibration targets labelled L, M and N are positioned at three known relative positions in a temporary coordinate system. The center target M may be selected for computation simplicity to be at the origin of the temporary coordinate system.

The included angle between each of two pairs of calibration target points is determined using the relationship of the light variation events when the sweeping beam intersects the target at each of those points with the known degrees in a complete sweep of the light beam.

Figure 3:
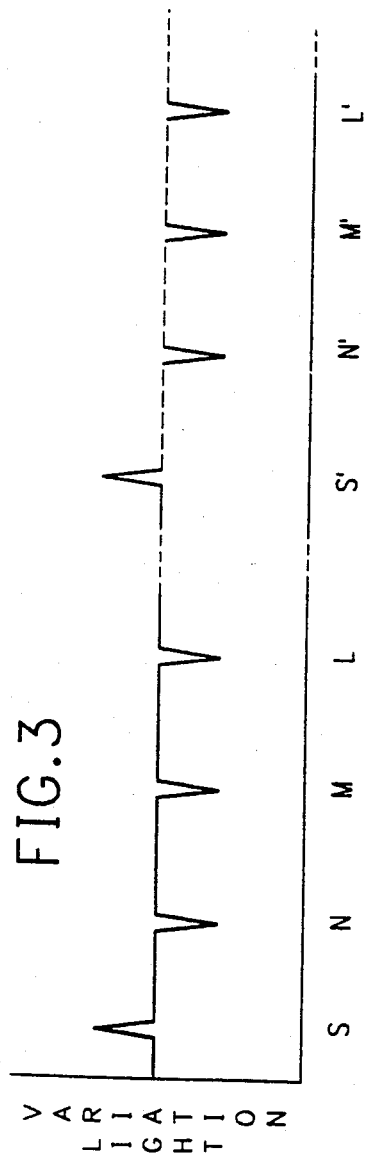
FIG. 3 is a graph of variation in light level with sweep rotational arc for a scanner in a light interrupt data input device.

A graph of the light variation with respect to rotational arc is shown in FIG. 3.

Referring to FIG. 3, a uniform background light level is interrupted with a first variation event when, depending on the type of apparatus, some arrangement is made to indicate Start, for example, by having the beam strike the detection photocell to produce the pulse labelled S. After some rotational arc displacement of the light beam assuming for scanner 1 of FIG. 2 a clockwise rotation, there will be another light variation event, in this case a reduction in light level, when the beam intercepts calibration target N. At a further rotational arc, there is a subsequent variation for calibration target M and a still subsequent variation for calibration target L at an even greater rotational arc. After a full rotation of the scanner, the signals repeat as indicated by S', N', M', L'. The angle scanned by the light beam between S and S' is exactly known, for example, 720 degrees for a scanner having 1 mirror facet. The inclusive angle A between the pair of calibration targets N and M and the inclusive angle B between the pair of calibration targets M and L for scanner 1 are then measured employing, in connection with the graph in FIG. 3, the ratio of the rotational readout between N and M for angle A and between M and L for angle B each with respect to the total rotational readout between S and S'.

The same procedure would be employed for scanner 2 to measure angles C and D.

Figure 4:
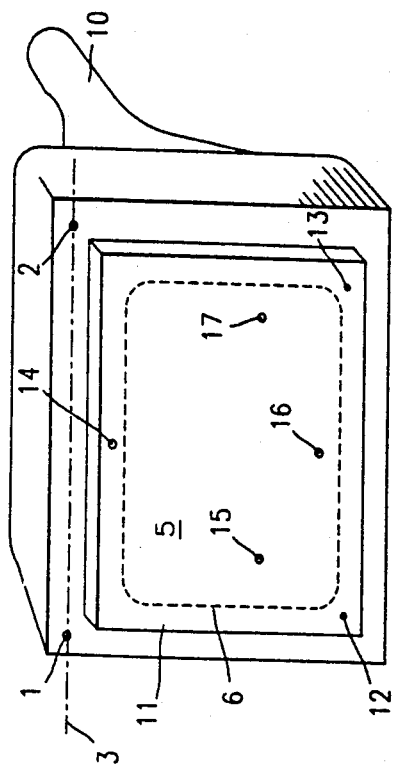
FIG. 4 is a three-dimensional schematic showing the light beam interrupt type of data input on a display surface with a template providing calibration targets.

The calibration targets L, M and N may be positioned using a template as shown in FIG. 4, wherein; on the work area face 5 of a cathode ray tube display 10, having two scanners 1 and 2 providing moving light beams over the face 5 between the user and the face 5; a template 11 is provided, fastened at 12, 13 and 14. The template 11 can be of any convenient material and is fastened so that motion will not take place until deliberately removed. The template provides three known locations 15, 16 and 17 for an object such as a pencil which would be positioned perpendicular to the face 5 and would interrupt the moving light beams. Objects at locations 15, 16 and 17 would correspond to calibration targets L, M and N in FIG. 2. It is of course essential in taking relative position data that there be no movement of the template between measurements of different targets which may be presented sequentially rather than simultaneously. However, a very substantial benefit of this method is that the location of the template does not enter into the calculations, and therefore no care is needed in positioning it apart from maintaining a steady position.

It will be apparent from the content of FIGS. 2 and 3 that once the location of scanners 1 and 2 are calculated in the temporary coordinate system, the azimuth of line 3 between the scanning axes can be established and when this is done there is then enough information present to calculate the index errors R and S employing geometric principles.

Figure 5:
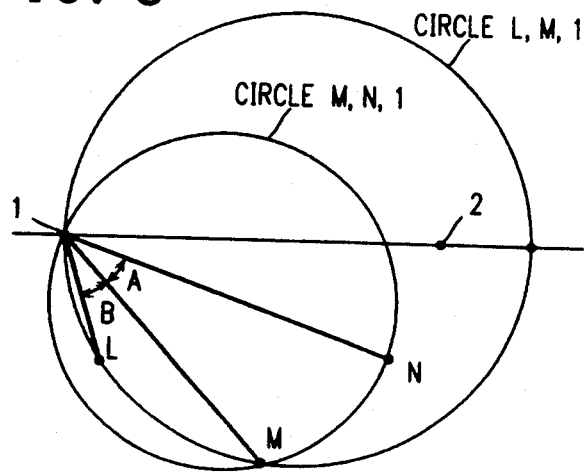
FIG. 5 is a geometric illustration showing the intersecting circles employed in establishing the location of the scanners.

Returning to FIG. 2, there is an established geometric principle that the locus of points of the pair of calibration targets L and M together with all points from which the line L-M subtends the angle B determined as previously described is a circle in which the known intertarget line L to M is a chord. Scanner 1 is to be found on this circle. The same is true for the pair of targets M and N. The circle, representing the locus of points including M, N and scanner 1 will intersect the circle involving L, M and scanner 1, at scanner 1. This fact is illustrated for scanner 1 in FIG. 5.

The same is true for scanner 2 and the location of scanner 2 in the temporary coordinate system would be determined using angles C and D in the same way.

Having established the X-Y coordinates in the temporary coordinate system for the two points, each being the axis of rotation of scanners 1 and 2 on line 3 in FIGS. 1 and 2, the actual angles to any of the targets may be calculated. The index errors R and S may then be established by subtracting the actual angles to the targets from the readout angles, as measured from the electrical Start signals. The index angle corrections are used to correlate the electrical timing with the mechanical movement in the scanning light interrupt type of data input device.

BEST MODE FOR CARRYING OUT THE INVENTION

A temporary coordinate system is defined. For simplification of calculations, the three calibration targets L, M and N of FIG. 2 are selected to be on the x axis with the origin of the system to be at the center target. These targets will be referred to as F, G and H and their position is illustrated in connection with FIG. 6. As illustrated, F, G and H are on the x axis and G is on the y axis defining the origin of the temporary system. Thus, using T for temporary, the x and y coordinates of F would be expressed as $-6TF$ and $0TF$, the x and y coordinates of G selected to be at the origin would both be expressed as $0TG$ and the x and y coordinates of H would be expressed as $6TH$ and $0TH$.

Figure 6:
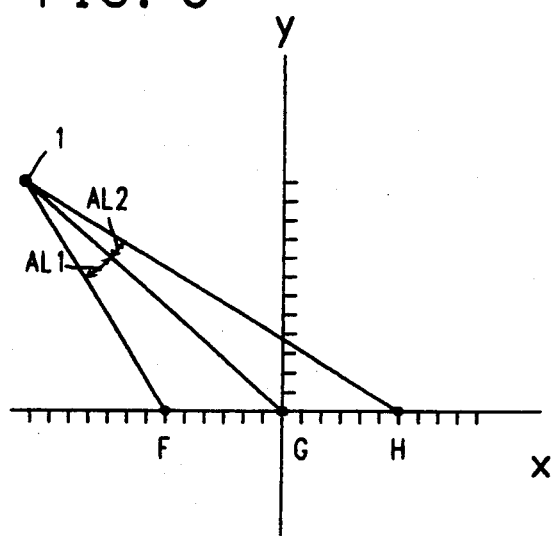
FIG. 6 is a geometric illustration of the calibration targets, one scanner and the angles between the targets in a temporary coordinate system.

Considering first the left scanner which is the scanner labelled 1 in FIGS. 1 and 2, the angles subtended by the two pairs of targets F and G and G and H and labelled AL1 and AL2, respectively, in FIG. 6 are established measuring the electrical angle from an electrical start signal serially until there is a light variation at the targets as shown in FIG. 3 and relating the rotational arc to the degrees of sweep. It should be noted that since the scanner is a rotating mirror that moves through 360 degrees and reflects light from a stationary source, then, since the beam from the stationary source reflects from the moving mirror at an angle equal to the angle of reflection, in one revolution the sweeping beam will move through 720 degrees of arc. Thus, AL1 would be the number of degrees of rotational arc from start to a light variation when target G is intercepted, subtracted from the degrees of rotational arc from start to the light variation when target F is intercepted. AL2 is the number of degrees of rotational arc from start to a light variation when target H is intercepted, subtracted from the number of degrees of rotational arc from start to the light variation when target G is intercepted.

The angles AL1 and AL2 and the locations of the targets F, G and H are used to establish the x and y coordinates of scanner 1. This is done using the circular locus of points subtending the angle AL1 including on the circumference thereof points F, G and the scanner.

Referring to FIG. 7, an illustration of the circular locus of points 20 illustrating two, I and J, of the infinite number of possible scanner positions.

The circular locus of points subtending the angle AL2 including on the circumference thereof points G, H and the scanner produces another circle similar to that shown in FIG. 7. The two circles are shown in FIG. 8 with the left scanner 1 located at the intersection at x and y coordinates $-3T1$ and $6T1$, respectively.

The coordinates of the center 21 of the circle for AL1 may be established as set forth in Equations 1 and 2 using XC1 and YC1 as the coordinates of the center 21 of the circle.

$$XC1 = 0.5\ XTF \qquad \text{Equation 1}$$

and $$YC1 = 0.5\ \frac{XTF}{\text{TANGENT } AL1} \qquad \text{Equation 2}$$

The coordinates of the center 22 of the circle for AL2 may be established as set forth in Equations 3 and 4 using XC2 and YC2 as the coordinates of the center 22 of the circle.

$$XC2 = 0.5\ XTH \qquad \text{Equation 3}$$

$$YC2 = 0.5\ \frac{XTH}{\text{TANGENT } AL2} \qquad \text{Equation 4}$$

The calculations have been simplified by the choice of target G being located at the origin of the coordiate system.

Having established the coordinates of the centers 21 and 22 of the circles, it is now necessary to establish the coordinates of the intersection.

In FIG. 8, the line 21-22 joining the center of the circles has a slope M, as described in Equation 5 where C1 is the center at 21 and C2 is the center at 22.

$$\text{Slope}_{21-22} = M = \frac{(YC2 - YC1)}{(XC2 - XC1)} \qquad \text{Eq. 5}$$

The standard descriptive geometric equation of this line is as in Equation 6.

$$Y = YC1 + M(X - XC1) \qquad \text{Eq. 6}$$

In the geometry of the intersection of the two circles, there is a principle establishing the line 21-22 which forms a right angle with the line G-1 which line links the center or origin of the temporary coordinate system G and the scanner 1.

It is known from elementary calculus that the slope of the line G-1 is then the negative inverse of the slope of the line 21-22 as in Equation 7.

$$\text{Slope}_{G-1} = -\frac{1}{M} \qquad \text{Eq. 7}$$

Because line G-1 passes through the origin G, the descriptive geometric equation is as in Equation 8.

$$Y = -\frac{X}{M} \qquad \text{Eq. 8}$$

The intersection of these lines 21-22 and G-1 occurs at point labelled K. Point K is equidistant between the origin at G and the scanner at 1. Therefore, the scanner coordinates can be found by calculating the coordinates (XK, YK) of the point K and then doubling the values.

The coordinates (XK, YK) may be obtained by solving Equations 6 and 8 simultaneously.

$$XK = \frac{M(MXC1 - YC1)}{1 + M^2} \qquad \text{Eq. 9}$$

$$YK = -\frac{XK}{M} \qquad \text{Eq. 10}$$

The scanner coordinates (X1, Y1) are thus established by doubling XK and YK in Equations 9 and 10:

$$X1 = 2\frac{M(MXC1 - YC1)}{1 + M^2} \qquad \text{Eq. 11}$$

$$Y1 = -2\frac{XK}{M} \qquad \text{Eq. 12}$$

The procedure for establishing X1 and Y1 for scanner 1 is repeated for scanner 2 using angles corresponding to angles C and D in FIG. 2 which in FIG. 6 would be angles originating at scanner 2, not shown, and subtending H and G corresponding to angle D of FIG. 2 and G and F corresponding to angle C of FIG. 2.

Scanner 2 can be an actual scanner in a two scanner system or a virtual image of a scanner in a single scanner system.

Figure 9:
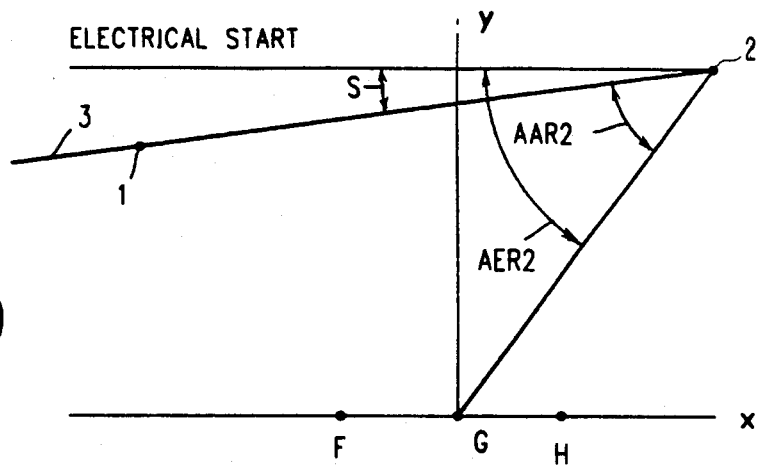
FIG. 9 is a geometric illustration of the relationship of an electrically indicated angle and an actual angle.

Having the x and y coordinates of each scanner 1 and 2, referring to FIG. 9, all needed information concerning line 3 is available since two points and the distance between them have been established.

Considering the right or scanner 2, the electrically indicated angle AER2 from Start to the light indication for target G has been established, then the actual angle AAR2 plus the index error S would equal the established value of AER2.

The index error S is developed as follows referring to FIG. 10. Line AB going through the axis of rotation of scanner 2 is parallel to the x axis of the temporary coordinate system on which targets F, G and H are positioned. Line BC is perpendicular to the temporary x axis with the origin of the temporary coordinate system being at G. The desired angle is AAR2.

The line 3 between the scanners 1 and 2 may be tilted with respect to the temporary x axis. The tilt angle is labelled AT in FIG. 10 and is established as shown in Equation 13.

$$AT = \text{ARC TANGENT } \frac{Y2 - Y1}{X2 - X1} \qquad \text{Equation 13}$$

Figure 10:
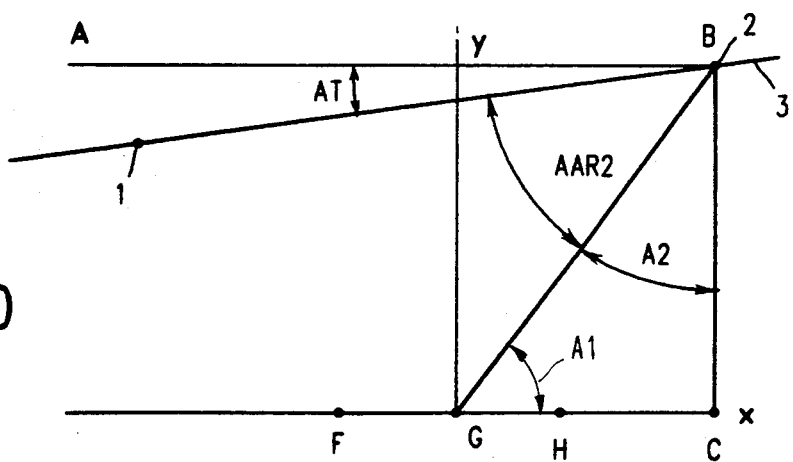
FIG. 10 is a geometric illustration of the angle of the base line with the temporary coordinate system.

In FIG. 10, the interior angle A1 of the diagonal BG between lines AB and the x axis which are parallel is as expressed in Equation 14.

$$A1 = \text{ARC TANGENT } \frac{Y2}{X2} \qquad \text{Equation 14}$$

Since triangle GCB is a right triangle, angle A2 is as expressed in Equation 15.

$$A2 = 90 - A1 \qquad \text{Eq. 15}$$

Further, since angle A,B,C is a right angle, the relationship is as expressed in Equation 16.

$$90 = AT + AAR2 + A2 \qquad \text{Eq. 16}$$

From equations 15 and 16, equation 17 results.

$$AAR2 = A1 - AT \qquad \text{Equation 17}$$

Therefore, since AT is known from Equation 13, A1 is known from Equation 14, AER2 is known from measurement, then the index error of line 3 for the right scanner 2 would be determined from the expression in Equation 18.

$$OR = S = AAR2 - AER2 \qquad \text{Eq. 18}$$

The OL or index error for the left scanner 1 is established in the same manner.

The index error is then algebraically subtracted from each angle measurement and used to correlate the mechanical movement with the electrical signals and thereby to correct all angular measurements.

The calculations employed in the invention when implemented in data processing may be facilitated by using a digital number that progresses in accordance with the degrees in an angle.

It will be apparent to one skilled in the art that there will be many variations and substitutions that may be made within the principle of employing a combination of measurement with respect to the electrical system, and the application of geometric principles to provide a correction for a variation between the electrical system references and those of the mechanical motion system.

Having thus described our invention, what we claim as new and desire to secure by Letters Patent is:

1. The process of coordinating electrical signal timing and mechanical sweep movement in a device wherein the position of an object in an area is determined by the interruption of a scanning light comprising in combination the steps of:

determining the magnitude of the index angular difference between the position of the mechanical sweep movement when the electrical signal indicating the beginning of a mechanical scanning sweep movement occurs and a base line through the scanning axis, and correcting by at least one of addition or subtraction said index angular difference from the indicated angle at each scanning light interruption event.

2. The process of claim 1 wherein said base line passes through the scanning axis of two mechanical sweep movement members.

3. The process of claim 1 wherein said index angular difference determining step includes the steps of:

positioning first, second and third temporary calibration targets in said area having separate known relative distances between said first and said second and between said second and said third calibration targets, determining the sweep angle between a light interruption event at said first and second and again at said second and third pairs of said calibration targets, determining the coordinates of said scanning axis from the coordinates of the intersection of a circle having said first, said second and said axis on the circumference thereof with a circle having said second, said third and said axis on the circumference thereof with respect to a calibration coordinate system including said calibration targets, and determining the angle of said base line through said scanning axis with respect to said calibration coordinate system, determining the angle between said first calibration target and the beginning of said electrical indication of said sweep, and establishing said index angle as the difference between the angle between said first calibration target and the beginning of said electrical indication of said sweep and said angle of said base line.

4. The process of claim 3 wherein said base line joins the rotational axis of one scanner with the rotational axis of a virtual scanner.

5. In apparatus of the type where the location of an object is sensed by a variation in light level when a scanning light beam strikes it, the improvement for establishing a reference from which angular points in an angular scan progress are reckoned comprising in combination means establishing a reference line through at least one scanning axis, and further means employing measurement with respect to electrical signals and the application of geometric principles for defining a correction factor relating the electrical signal system to said line.

6. In data input apparatus of the type where the location of an object in a work area is determined by angular measurement information at the intersection with the object of a beam of light that sweeps around an axis that is perpendicular to said work area, the improvement comprising in combination means for determination of the magnitude of an index error angular difference between the electrical indication of the beginning of a sweep of said beam of light and a reference line related to the coordinate system for said data, and means for algebraic subtraction of said index error angular difference from each said angular measurement.

7. The apparatus of claim 6 wherein said beam of light is a continuously rotating mirror reflecting a light from a stationary source.

8. The apparatus of claim 7 wherein said continuously rotating mirror is driven by a synchronous motor having the rotation thereof measured by a digital counter incremented by a constant frequency clock.

9. The apparatus of claim 6 wherein said determination means includes test object location information positioned in a template mounted in said work area.

* * * * *